United States Patent [19]

Stifle

[11] 3,911,417

[45] Oct. 7, 1975

[54] METHOD AND APPARATUS FOR PLOTTING LINE SEGMENTS AND CHARACTERS ON A DISPLAY DEVICE

[75] Inventor: John E. Stifle, Urbana, Ill.

[73] Assignee: University of Illinois Foundation, Urbana, Ill.

[22] Filed: Apr. 27, 1973

[21] Appl. No.: 355,009

[52] U.S. Cl. ...... 340/324 M; 315/169 TV; 340/343
[51] Int. Cl.$^2$ ...... G06K 15/18
[58] Field of Search ...... 340/324 A, 324 M, 343; 315/18, 169 R, 169 TV

[56] References Cited

UNITED STATES PATENTS

| | | | |
|---|---|---|---|
| 3,691,551 | 9/1972 | Kashio | 340/324 A |
| 3,696,394 | 10/1972 | Kashio | 340/324 A |
| 3,713,134 | 1/1973 | Chaney | 340/324 A |
| 3,757,095 | 9/1973 | Kiwiet | 340/324 A |
| 3,775,760 | 11/1973 | Strathman | 340/324 A |

*Primary Examiner*—Marshall M. Curtis
*Attorney, Agent, or Firm*—Merriam, Marshall, Shapiro & Klose

[57] ABSTRACT

A remote input/output computer terminal incorporating a line generator utilizing a novel method for plotting lines on a digitalized display device such as a plasma display panel and a character generator for pictorially presenting information such as graphs, anatomical drawings, alpha-numeric characters and the like thereon is disclosed. The method of line generation is used in plotting straight line segments on the plasma panel at the rate of sixty lines per second. The character generator contains a pair of read-only memories (ROMs) and a pair of random-access memories (RAMs) containing the points for plotting 256 different characters. The RAMs can be loaded through the computer with special or graphical data as required by the terminal user while the ROMs contain certain standard characters and symbols.

20 Claims, 7 Drawing Figures

METHOD AND APPARATUS FOR PLOTTING LINE SEGMENTS AND CHARACTERS ON A DISPLAY DEVICE

The present invention relates generally to a remote input/output terminal having graphical capabilities for use with a central computer and more particularly to a remote computer terminal incorporating a line generator utilizing a novel method of generating straight line segments and a character generator for graphically displaying pictorial information and a variety of characters and symbols on a terminal display device.

Reference may be made to the following U.S. Pat. Nos. 3,701,988; 3,685,039; 3,675,230; 3,544,972; 3,528,068; 3,459,926; 3,430,207; 3,396,377; 3,345,458; and 3,325,802. The following U.S. Pat. Nos. may also be of interest: 3,713,135; 3,713,134; 3,711,849; 3,702,470; 3,696,388; 3,688,299; 3,686,662; 3,680,075; 3,675,232; 3,671,957; 3,668,687; 3,665,408; 3,660,833; 3,651,481; 3,641,555; 3,638,214; 3,629,841; 3,623,005; 3,621,214; 3,618,026; 3,611,346; 3,609,743; 3,602,702; 3,597,757; 3,593,310; 3,582,905; 3,581,290; 3,579,224; 3,562,718; 3,539,860; 3,509,542; 3,500,332; 3,473,157; 3,457,371; 3,438,001; 3,422,419; 3,400,377; 3,394,367; 3,391,392; 3,388,391; 3,364,479; 3,336,497; 3,329,948; and 3,305,841.

In addition, reference may be made to an article entitled "The Plato IV Student Terminal," J. Stifle, published in the Proceedings Of The Society For Information Display, Vol. 13, No. 1, First Quarter, 1972.

As the cost of institutional education increases and the demand for diverse curriculum likewise increases, the need for an individualized computer-aided-instruction system has become apparent. Such a system can ultimately provide high quality computer-based education at low cost while simultaneously serving a great many users through remote input/output terminals coupled to a large central computer. There are three general requirements which should be satisfied by a remote computer-aided-instruction input/output computer terminal to optimumly utilize the central computer.

First, the remote terminal must be capable of serving the needs of a broad class of relatively unsophisticated users, most of whom will be encountering computer terminals for the first time. Users might include, for example, grade school students studying arithmetic or geography, high school students studying French or Spanish, and college students studying biology or chemistry. The terminal must present information to each of these users in a form that he can readily understand.

Consequently, such a remote terminal should have graphical capability. It must be able to present pictorial information such as maps, graphs, circuit diagrams, and anatomical drawings on a display device. The terminal must also be capable of displaying foreign language characters and any special symbols which may be unique to a particular subject under study as well as upper and lower case English alphanumeric characters.

Second, the terminal should be capable of remote operation via low-grade telephone lines. This is essential to permit the locating of remote terminals in widely separate schools without the need for expensive communication links. Operation over low-grade telephone lines implies a limited available bandwidth, and consequently, provision should be made for local storage of information within the terminal.

And, finally, the remote terminal should be relatively inexpensive to be competitive with the present cost of education.

SUMMARY OF THE INVENTION

According to the present invention there is provided a method of plotting a line on a display device such as a plasma display panel from an origin at the initial coordinates, $x_o$ and $y_o$, contained in corresponding X and Y coordinate registers, respectively, to an end point at the final coordinates, $x_f$ and $y_f$, contained in corresponding $X_F$ and $Y_F$ final coordinate registers, respectively. The method comprises subtracting the initial coordinates $(x_o, y_o)$ from the corresponding final coordinates $(x_f, y_f)$ to obtain the differential quantities, $x_f - x_o$ and $y_f - y_o$. The differential quantities, $x_f - x_o$ and $y_f - y_o$, are loaded into corresponding ΔX and ΔY increment registers, and the $X_F$ and $Y_F$ final coordinate registers are cleared. The differential quantity, $x_f - x_o$, contained in the ΔX increment register is repetitively added to the contents of the $X_F$ final coordinate register in an X ADDER. Similarly, the differential quantity, $y_f - y_o$, contained in the ΔY increment register is repetitively added to the contents of the $Y_F$ final coordinate register in a corresponding Y ADDER. The result sums are loaded into the corresponding final coordinate registers after each addition to replace the contents previously contained therein. The appropriate X and/or Y coordinate register(s) coupled to the display device are counted or incremented once whenever the addition results in an overflow in the corresponding ADDER(s), addition continuing until the contents of the X and Y coordinate registers are equal to the corresponding final coordinates, $x_f$ and $y_f$.

More particularly, the method comprises comparing the $x_o$ and $x_f$ coordinates and the $y_o$ and $y_f$ coordinates to terminate the line plotting operation if the corresponding coordinates are identical. The $x_o$ and $y_o$ coordinates contained in the X and Y registers are loaded into the ΔX and the ΔY increment registers, respectively, and the $x_f$ and $y_f$ coordinates contained in the XF and YF registers are loaded into the X and the Y ADDERs, respectively. The $x_o$ and $y_o$ coordinates are complemented and transferred to the corresponding ADDERs where the $x_f$ and complemented $x_o$ coordinates are added and the $y_f$ and complemented $y_o$ coordinates are added, together with binary subtraction correction factors of 000 000 001, to provide the differential quantities, $x_f - x_o$ and $y_f - y_o$. If the final coordinate is negative with respect to the corresponding initial coordinates, an overflow results in the corresponding ADDER(s), setting the X and/or Y register(s) to count or incremented down (decrement). The X and Y registers are otherwise set to count or increment up. The differential quantities, $x_f - x_o$ and $y_f - y_o$, are loaded into the ΔX and ΔY registers, respectively, and the $X_F$ and $Y_F$ registers are cleared. The contents of the corresponding ΔX and/or ΔY register(s) are complemented and transferred through the corresponding ADDER(s) and loaded back into the corresponding ΔX and/or ΔY register.

Whenever an overflow has resulted in the ADDER(s) during the addition, the $X_F$ and $Y_F$ registers are set to binary ½ (100 000 000), and the differential quantities, $x_f - x_o$ and $y_f - y_o$, are shifted in the corresponding ΔX and ΔY registers until a binary 1 appears in the most significant bit position of either increment (ΔX and ΔY) register. The contents of the ΔX register are repetitively added to the contents of the $X_F$ register and the contents of the ΔY register to the contents of the $Y_F$ register in the corresponding X and Y ADDERs. The resultant sums are loaded into the corresponding final coordinate ($X_F$ and $Y_F$) registers after each addition to replace the contents previously contained therein, and the appropriate X and/or Y register(s) are counted or incremented once whenever the addition results in an overflow in the corresponding ADDER(s). The points on the display device corresponding to the coordinates contained in the X and Y registers are lit as the X and Y registers are incremented from the initial coordinates of the origin to the final coordinates of the end point. After each repetitive addition operation, the contents of the X register are compared with the $x_f$ coordinate and the contents of the Y register with the $y_f$ coordinate to terminate the repetitive addition when the corresponding quantities are equal.

The character generator of the present invention may be incorporated in a remote input/output computer terminal for selectively plotting characters on a display device such as a plasma display panel. The character generator comprises a pair of addressable randon-access memories for storing a plurality of the characters. Both of the random-access memories have an output from which the characters can be read as the characters in both memories are synchronously advanced past the outputs. A memory address register is provided for selecting a particular one of the characters to be plotted on the display device. The memory address register designates a memory address corresponding to the random-access memory containing the selected character and a character address corresponding to the location of the selected character in the random-access memory. Control means as also included for reading the characters at the designated character address from both of the random-access memories responsive to the address of the characters appearing at the outputs corresponding to the character address contained in the memory address register. Gating means coupled to the outputs of the random-access memories and responsive to the memory address contained in the memory address register selectively couple the random-access memory containing the selected character to the display device.

More particularly, in an embodiment of the present invention the control means comprises an address counter and comparator means. The address counter counts in synchronism with the characters being advanced past the memory outputs so that the count is representative of the character address of the characters appearing simultaneously at the memory outputs. The comparator means then compares the count in the address counter with the character address contained in the memory address register to generate an enable signal for reading the selected character from the memory outputs.

Load-circulate means are also included for loading a new character into a selected one of the character addresses to replace any character previously contained therein and for continuously circulating the characters in both of the memories past corresponding memory outputs.

Further, the gating means comprises logic gates, each having one input coupled to the output of the corresponding random-access memory and a second input coupled to the memory address bit registers of the memory address register. The logic gates are responsive to the memory address to couple the selected character from the memory output to the display device.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawing, in which like reference numerals identify like elements in the several figures and in which:

DETAILED DESCRIPTION

Figure 1:
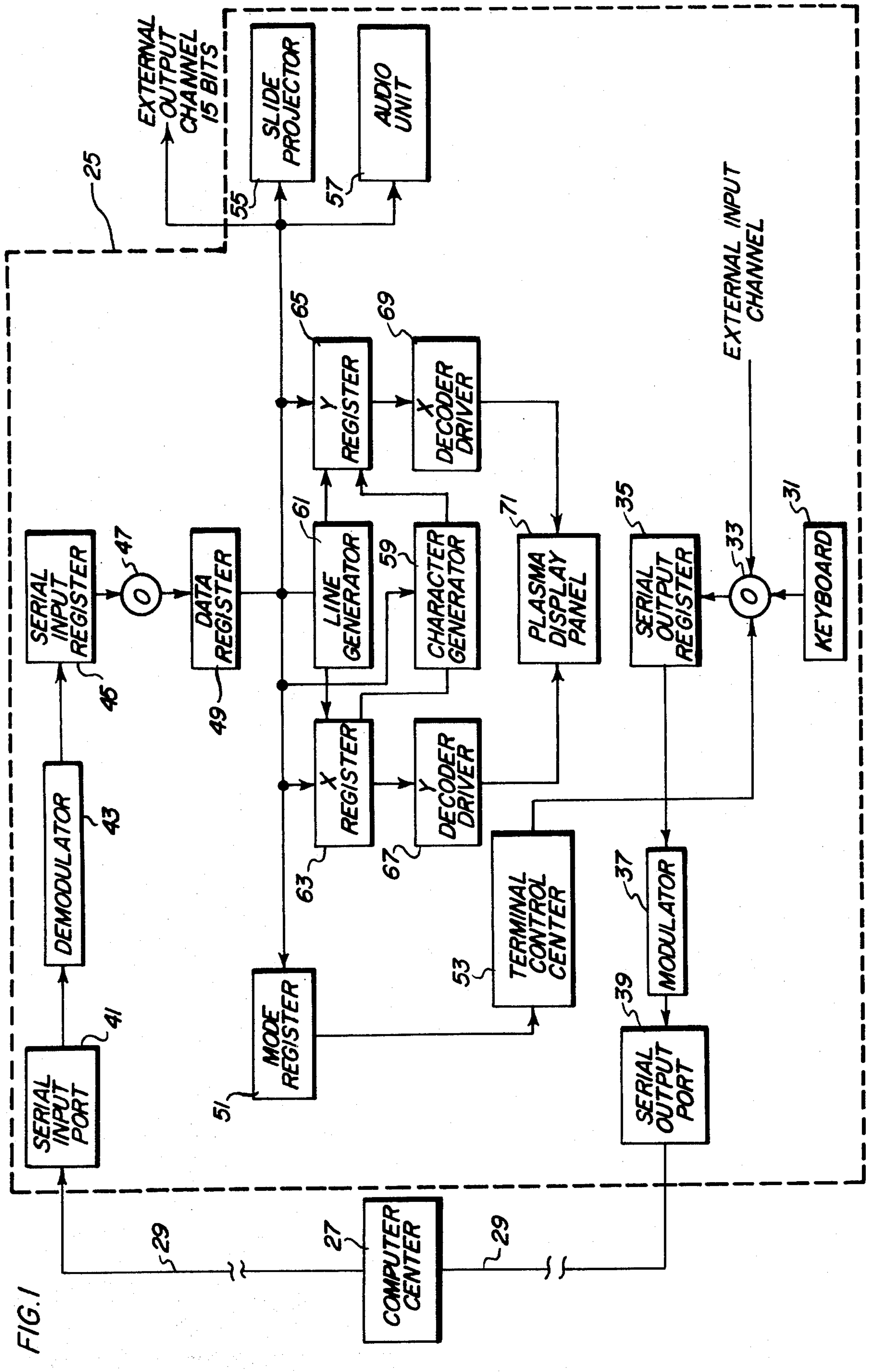
FIG. 1 is a block diagram of the remote input/output terminal.

With reference to FIG. 1, the re is shown a remote computer input/output terminal incorporating a line generator utilizing a novel method of plotting straight line segments and a character generator for pictorially presenting information such as graphs, anatomical drawings, alpha-numeric characters and the like on a digitalized display device such as a plasma display panel.

The remote input/output terminal 25 is coupled to a large central computer 27 over voice-grade telephone circuits 29, transmitting frequency-modulated (FM) information to the central computer 27 and, in a similar manner, receiving instructions and data therefrom.

A keyboard 31 provides the remote terminal operator with an input link to the computer 27. Information from the keyboard 31 is sequentially coupled through an OR gate 33 to the serial output register 35 where it is collected until a complete binary word has been assembled. The word is then shifted into aa modulator 37 and encoded as a frequency-modulated (FM) signal for transmission from the serial output port 39 to the computer center 27 over the voice-grade telephone circuits 29. An additional input to the serial output register 35 through OR gate 33 is provided to permit access to the computer center 27 by externally-connected equipment.

Instructions and data from the computer 27 are, in turn, received at the serial input port 41 of the remote terminal and coupled to the demodulator 43 where the binary information is recovered from the FM signal. The binary information is then shifted into a serial input register 45 where a complete word comprising a plurality of bits is assembled. The entire word is subsequently transferred through an OR gate 47 to a data register 49 which serves as the data distribution center for the remote terminal.

Each word loaded into the data register 49 comprises either a control word or a data word. Control words are instructions addressed to a particular section of the remote input/output terminal for establishing certain operating conditions within the terminal. Data words, on the other hand, contain the data to be processed by the terminal in response to the conditions previously established by the control word.

To select a particular mode of operation, an appropriate control word is loaded into the data register 49 and subsequently transferred to the mode register 51. The mode register 51, responsive to the control word, in turn, directs the terminal control center 53 in a manner analogous to the instruction register in a digital computer. The terminal control center 53 provides the timing and control signals for controlling the flow of data within the remote terminal. The control center 53 is also coupled to the serial output register 35 so that terminal condition information can be transmitted to the computer center 27. Once placed in a particular operational mode, the remote input/output terminal remains in that mode until a new instruction (i.e., control word) is received.

Three external output channels are provided for operation of associated external equipment responsive to the receipt of an appropriate control word. One channel may be used to transmit instructions and/or data to a random access slide projector 55. The thin transparent structure of the plasma display panel permits the panel to be used as a screen for viewing information in the form of slides or microfiche projected on the rear of the panel. A second channel may be used to address an auadio response unit 57. The audio unit will, upon command from the computer 27, play back a message to the terminal operator. Other types of equipment which might be coupled to the terminal through the third channel include printers, or other hardcopy devices, and various types of data acquisition and recording equipment.

Similarly, the character generator 59 can also be selectively enabled by the terminal control center 53, responsive to an appropriate control word, thc generate various characters and/or symbols on the plasma display penal selected by subsequent data words. More particularly, the character generator 59 includes several read-only memories and several random-access memories, each containing information for plotting a plurality of characters or symbols. While the read-only memories contain certain standard symbols such as upper and lower case English alphanumeric characters, the random-access memories can be loaded by the computer 27 with foreign language characters, graphical data and special symbols unique to a particular subject as required by the terminal user. Thus, the repertoire of the character generator 59 can be dynamically altered by the computer 27. Subsequent data words addressed to a particular location in the memories cause the corresponding symbols or characters at that address to be displayed on the plasma display device.

The line generator 61 is effective to draw, i.e., plot, straight line segments on the plasma display panel after being enabled by an appropriate control word. Accordingly, a plurality of these straight line segments can be combined to form geometric shapes, graphs, and even pictorial drawings such as houses, animals and the like. More particularly, immediately after the line generator 61 is enabled, a data word determinative of the end point coordinates ($x_f$, $y_f$) of the line to be plotted is loaded into the data register 49. The initial coordinates ($x_o$, $y_o$) corresponding to the origin of the line are already contained in the X and Y coordinate registers, 63 and 65, respectively. The line generator 61 operates on the end point data to simultaneously increment or count the X and Y coordinate registers 63 and 65 from the origin ($x_o$, $y_o$) to the end point ($x_f$, $y_f$) of the line, approximately a straight line as nearly as possible.

The outputs of the X and Y coordinate registers 63 and 65 are, in turn, coupled to the corresponding X and Y decoder/driver circuits, 67 and 69, respectively, where the binary contents of the X and Y coordinate registers 63 and 65 are converted into their decimal equivalents for application to the corresponding coordinates of the plasma display panel 71.

The plasma display panel 71 is a substantially square matrix array comprising a plurality of addressable points, each defined by a particular "x" and "y" coordinate. Accordingly, as the X and Y coordinate registers 63 and 65 are counted or incremented from the origin of the line to its end point, the X and Y decoder/-drivers, 67 and 69, fire, i.e., light, the corresponding coordinate points on the display panel 71 to approximate a straight line. Thus, pictorial information can be presented on the plasma display panel 71 by addressing the corresponding points on the panel which must be lit to portray the desired information.

In one embodiment of the present invention, a square plasma display panel having 512 addressable points along both its X-axis and its Y-axis is utilized. Thus, the address of any point on the panel can be specified by eighteen bits of binary information, nine bits in the X coordinate register 63 to define the $x$ coordinate and nine bits in the Y coordinate register 65 to define the $y$ coordinate. Two additional bits of information are required to complete the word: one to identify the word as either a control word or a data word and the other to serve as a parity error bit. Accordingly, a twenty bit word format is utilized in transmitting both data words and control words from the computer to the remote terminal.

Figure 2:
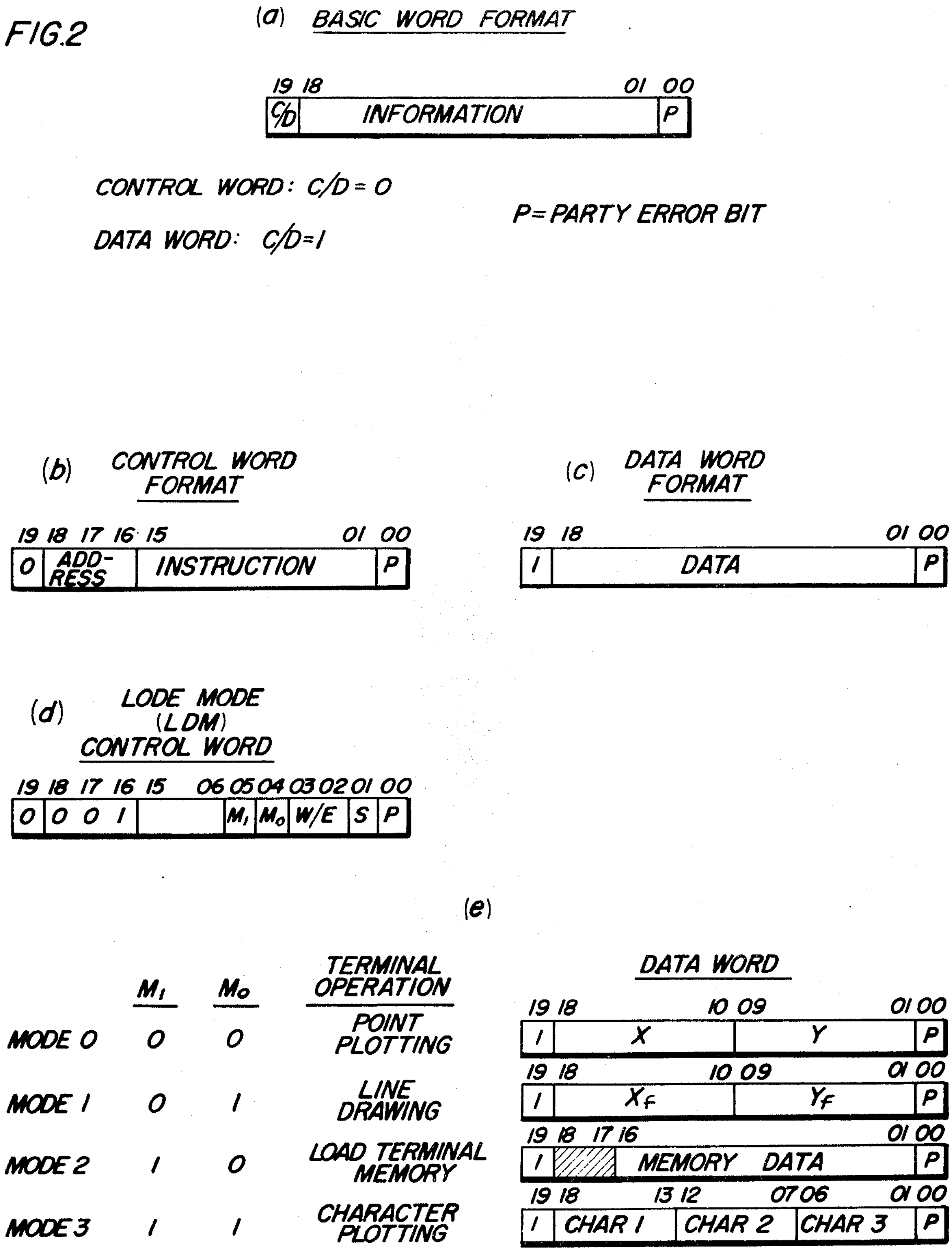
FIG. 2 illustrates a word format which can be used in transmitting and receiving instructions and data from the central computer.

Referring now to FIG. 2, an example of one basic word format which can be used in conjunction with the remote input/output terminal of the present invention is shown. There (FIG. 2$a$), it may be seen that the most significant bit, designated generally at 19, identifies each word as either a control word or a data word. More particularly, a binary 0 in the bit 19 position indicates a control word while a binary 1 indicates a data word. Bits 01-18 are utilized to convey information, and the 00 bit is the parity error bit.

In each control word (FIG. 2$b$), bits 16-18 designate the address or destination of the control word within the terminal, and the remaining bits, 01-15, are used to convey commands or instructions to the addressed section of the terminal, setting up certain operating conditions therein (e.g. enabling the line generator and disabling the character generator or vice versa). Subsequent data words (FIG. 2*c*) utilize bits 01-18 to convey data to the remore terminal for processing.

In particular, the character generator and the line generator are selectively enabled by a Load Mode (LDM) instruction or control word (FIG. 2*d*). Bits 01-05 are reserved for an associated mode word which specifies the operational mode of the remote terminal. In the mode word, bit 01 is the screen command (S) bit while bits 02 and 03 control the selective write/erase functions of the generators. If the S bit is a 1, the entire plasma display panel is erased at the time the mode word is loaded into the mode register.

Bits 04 and 05 of the LDM instruction specify the particular mode of terminal operation. That is, the terminal control center 53, responsive to the LDM instruction being loaded from the data register 49 into the 5-bit mode register 51, enables the remote terminal to operate in one of four operational modes (FIG. 2*e*). Once the mode of terminal operation is selected, corresponding data words are used to introduce the data into the remote terminal.

Figure 3:
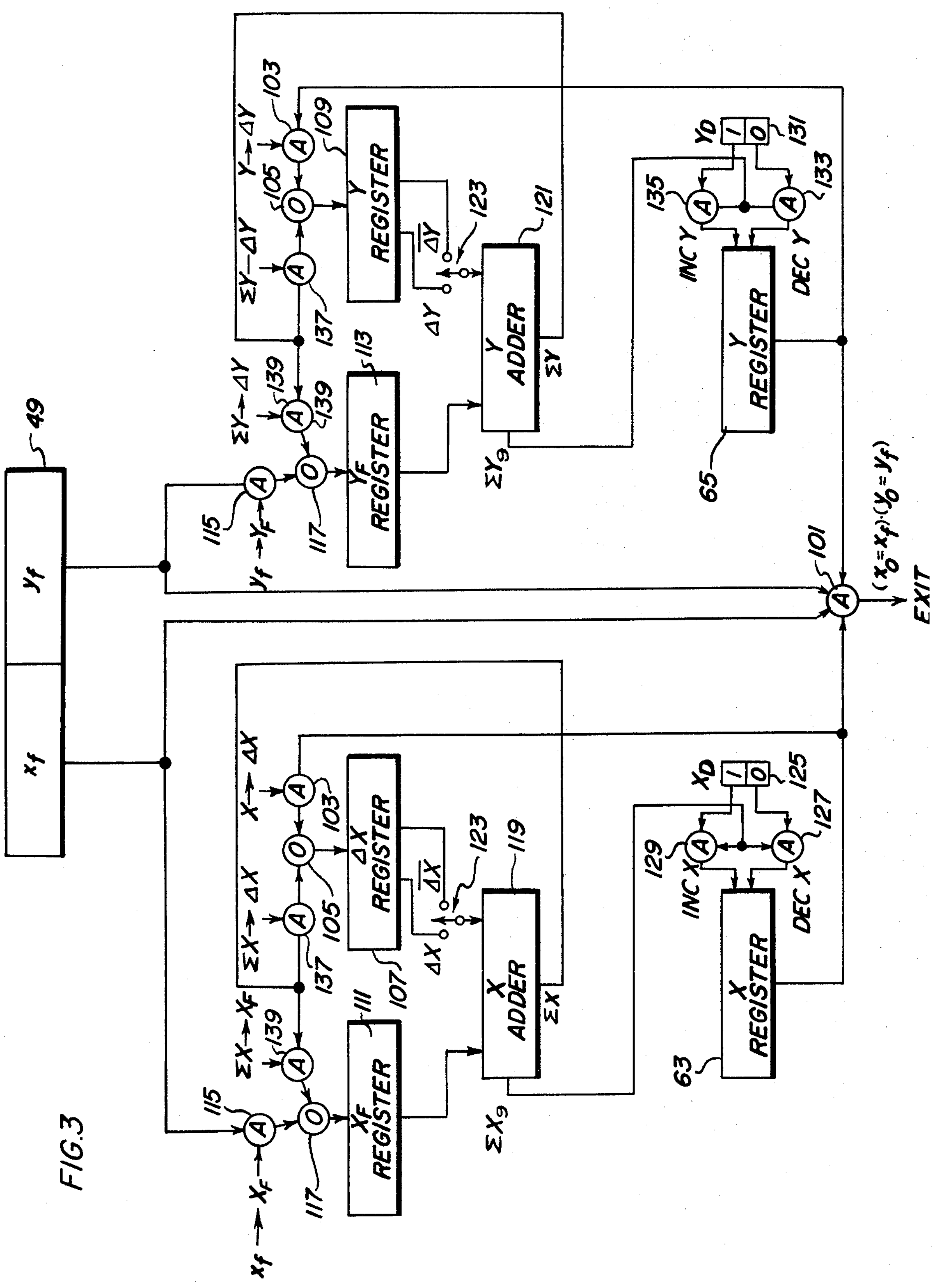
FIG. 3 is a combined block and schematic diagram of the novel line generator incorporated in the remote input/output terminal of the present invention.

A line generator in accordance with the present invention is shown in greater detail in FIG. 3. It should be initially noted that the line generator comprises two identical sections: an X section for computing the $x$ coordinate and a Y section for computing the $y$ coordinate. The operations of the X and Y sections, although independent, are identical.

Operationally, upon the line generator being enabled by a Mode 1 (line drawing) LDM control word, the X and Y decoder/driver circuits 67 and 69 as previously mentioned, convert the initial coordinates ($x_o$, $y_o$) contained in the X and Y coordinate registers 63 and 65 into their corresponding decimal equivalents while determine the position of the corresponding coordinate point, i.e., cell, on the plasma display panel. In turn, the point on the plasma display panel 71 corresponding to the origin ($x_o$, $y_o$) of the line to be plotted is it upon the receipt of a control signal from the terminal control center 53.

A Mode 1 data word (FIG. 2*e*) is then loaded into the date register 49 to establish the end point coordinates ($x_f$, $y_f$) of the line to be plotted.

An AND gate 101 having corresponding inputs coupled to each of the $X_F$ and $Y_F$ outputs of data register 49 and the outputs of X and Y coordinate registers 63 and 65 compares the $x_f$ coordinate contained in bits 10-18 of the data register 49 with the initial coordinate $x_o$ contained in the X coordinate register 63 and the $y_f$ coordinate, i.e., bits 01-09 of data register 49, with the $y_o$ coordinate found in the Y coordinate register 65. If the initial and final coordinates are equal ($x_o$=$x_f$; $y_o$=$y_f$), AND gate 101 generates an output signal to the terminal control center 53 terminating the line drawing process. This is the trivial case of drawing a line having zero length; that is, the end point address is the same as the starting point address. This is not, however, generally the case.

In the more general case, the contents ($x_o$, $y_o$) of the X and Y registers 63 and 65 are transferred through corresponding gating circuits, each comprising an AND gate 103, enabled by an appropriate control signal (i.e., X   ΔX and Y   ΔY) from the terminal control center 53, and an OR gate 105, and loaded into the ΔX and ΔY increment registers, 107 and 109, respectively. Simultaneously, the final coordinates ($x_f$, $y_f$) contained in the data register 49 ($y_f$ = bits 01-09 and $x_f$= bits 10-18) are likewise loaded into the $X_F$ final coordinate register 111 and the $Y_F$ final coordinate register 113, respectively, through corresponding gating circuits, each including an AND gate 115, enabled by an appropriate signal from the terminal control center 53 (i.e., $x_f$   $X_F$ and $y_f$   $Y_F$), and an OR gate 117.

The contents ($x_f$, $y_f$) of the $X_F$ and $Y_F$ final coordinate registers 111 and 113 are, in turn, coupled to the corresponding X and Y ADDERs 119 and 121, respectively. At the same time, the binary complements of the initial coordinates (i.e., $x_o$ and $y_o$) are coupled from the ΔX and ΔY increment registers 107 and 109 through identical gating circuits comprising AND gates 123 set to couple the corresponding ΔX and ΔY outputs to the X and Y ADDERs 119 and 121, respectively. In adding the complement of the initial coordinates ($x_o$, $y_o$) to the final coordinates ($x_f$, $y_f$) together with a binary subtraction correction factor of 000 000 001, the X and Y ADDERs 119 and 121 are, in effect, subtracting the initial coordinates of the line from the final coordinates to produce the binary equivalent of the differential quantities, $x_f$-$x_o$ and $y_f$-$y_o$, therein.

For example, when the end point ($x_f$, $y_f$) of the line to be plotted is negative with respect to the origin ($X_o$, $Y_o$), either on the X-axis or the Y-axis, an overflow results in the appropriate ADDER(s), 119 and/or 121. If an overflow occurs in the X ADDER 119, for example, the $X_D$ directional flip-flop 125 associated with the X coordinate register 63 is set to 0. This, in turn, enables the "decrement" AND gate 127. Accordingly, as the X coordinate register 63 is counted from the initial coordinate ($x_o$) to the final coordinate ($x_f$) responsive to the line generator, the X coordinate register 63 is decremented (i.e., incremented or counted down in a negative direction) to plot the line in the negative X direction. If, however, a overflow does not occur, the $X_D$ directional flip-flop 125 is set to 1 , and the "increment" AND gate 129 is enabled so that the X coordinate register 63 is incremented (counted up).

Similarly, if an overflow occurs in the Y ADDER 121, a corresponding $Y_D$ directional flip-flop 131 enables the "decrement" AND gate 133 so that Y coordinate register 65 is counted down to plot the line in the negative Y direction. Conversely, the "increment" AND gate 135 is set if no overflow occurs and the line is plotted in the positive Y direction.

The quantities $x_f$-$x_o$ and $y_f$-$y_o$, which are representative of the distance between the end points of the line along the X-axis and the Y-axis, respectively, are then transferred from the ADDER outputs ΣX and ΣY through identical gating circuits, each gating circuit comprising OR gate 105 and an AND gate 137 enabled by a terminal control signal (i.e., ΣX   ΔX and ΣY   ΔY) from the terminal control center 53, to the ΔX and ΔY increment registers 107 and 109, respectively. Also, the $X_F$ and $Y_F$ final coordinate registers 111 and 113 are cleared.

In the event that one or both of the directional flip-flops, 125 and 131, are set to 0, indicating that the line to be plotted is negative with respect to the X and/or the Y axis, an additional operation is performed. That is, the contents of the corresponding increment register 107 and/or 109 are complemented and transferred to the corresponding ADDER. Since the $X_F$ and $Y_F$ final coordinate registers 111 and 113 were cleared, the ADDER output is the complement of the contents of the increment register. This, in turn, is loaded back into the corredponding increment register 107 and/or 109. This operation, in effect, re-complements the differential quantity contained in the increment register if it is negative. This additional operation is required when a larger absolute BCD quantity (e.g., $x_o$) is subtracted from a smaller absolute BCD quantity (e.g., $x_f$) so that the resultant differential quantity is $x_f$-$x_o$.

In either event, once the correct differential quantities are loaded in the Δx and Δy increment registers 107 and 109, both the $X_F$ and the $Y_F$ final coordinate registers 111 and 113, respectively, are set to the binary equivalent of ½ (i.e., 100 000 000) to effect automatic round-off during subsequent addition in the ADDERs 119 and 121. The AND gtes 123 are set to transfer the uncomplemented contents (ΔX and ΔY) of the ΔX and ΔY increment registers 107 and 109 to the ADDERs 119 and 121, and the contents of the ΔX and ΔY increment registers 107 and 109 are then shifted to the left within the registers until one or both of the increment registers contains a binary 1 in its most significant bit position.

The contents of the ΔX and ΔY increment registers 107 and 109 are, in turn, added to the contents (100 000 000) of the $X_F$ and $Y_F$ final coordinate registers 111 and 113, respectively, in the ADDERs 119 and 121. The resultant sums are then loaded into the $X_F$ and $Y_F$ final coordinate registers 111 and 113 through OR gates 117 and corresponding AND gates 139 which are enabled by an appropriate control signal (ΣX XF and ΣY $Y_F$). If the addition results in an overflow signal (i.e., $\Sigma X_9$ and/or $\Sigma Y_9 = 1$) being generated by either the X ADDER 119 or the Y ADDER 121, the overflow signal is coupled to the corresponding "increment" and "decrement" AND gates at the inputs to the X and Y coordinate registers 63 and 65, incrementing the appropriate register if the corresponding directional flip-flop(s) 125 and/or 131 are set to 1 and decrementing the register if the directional flip-flop is set to 0. Responsive to a terminal control signal, the point on the plasma display panel corresponding to the coordinates ($x$, $y$) contained in the X and Y coordinate registers 63 and 65 is then lit.

The contents of the data register 49 and the X and Y coordinate registers 63 and 65 are then compared by AND gate 101 to determine if the end point of the line has been reached. If the line has beem completed the line drawing process is terminated, but if all of the corresponding quantities are not equal, the line generator continues to add the contents of the ΔX and ΔY increment registers 107 and 109 to the contents of the $X_F$ and $Y_F$ final coordinate registers 111 and 113, respectively, in the X and Y ADDERs 119 and 121, incrementing the X and Y registers 63 and 65 until the end point coordinates are reached and the line drawing process is terminated.

If a second straight line segment is to be plotted immediately thereafter, its origin ($x_o$, $y_o$) will be determined by the contents of the X and Y coordinate registers, 63 and 65, unless the contents are altered via a computer instruction moving the origin to a different point.

Thus, figures can be drawn on the plasma display panel. For example, a series of short straight line segments can be plotted to form geometric shapes such as circles while longer segments can be used to draw triangles or the like. Moreover, since the origin of a succeeding line segment can be displaced from the end point of the preceding line, a continuous series of line segments can be broken and a new line started, thereby facilitating the plotting of charts or pictorial drawing on the plasma panel.

Figure 4:
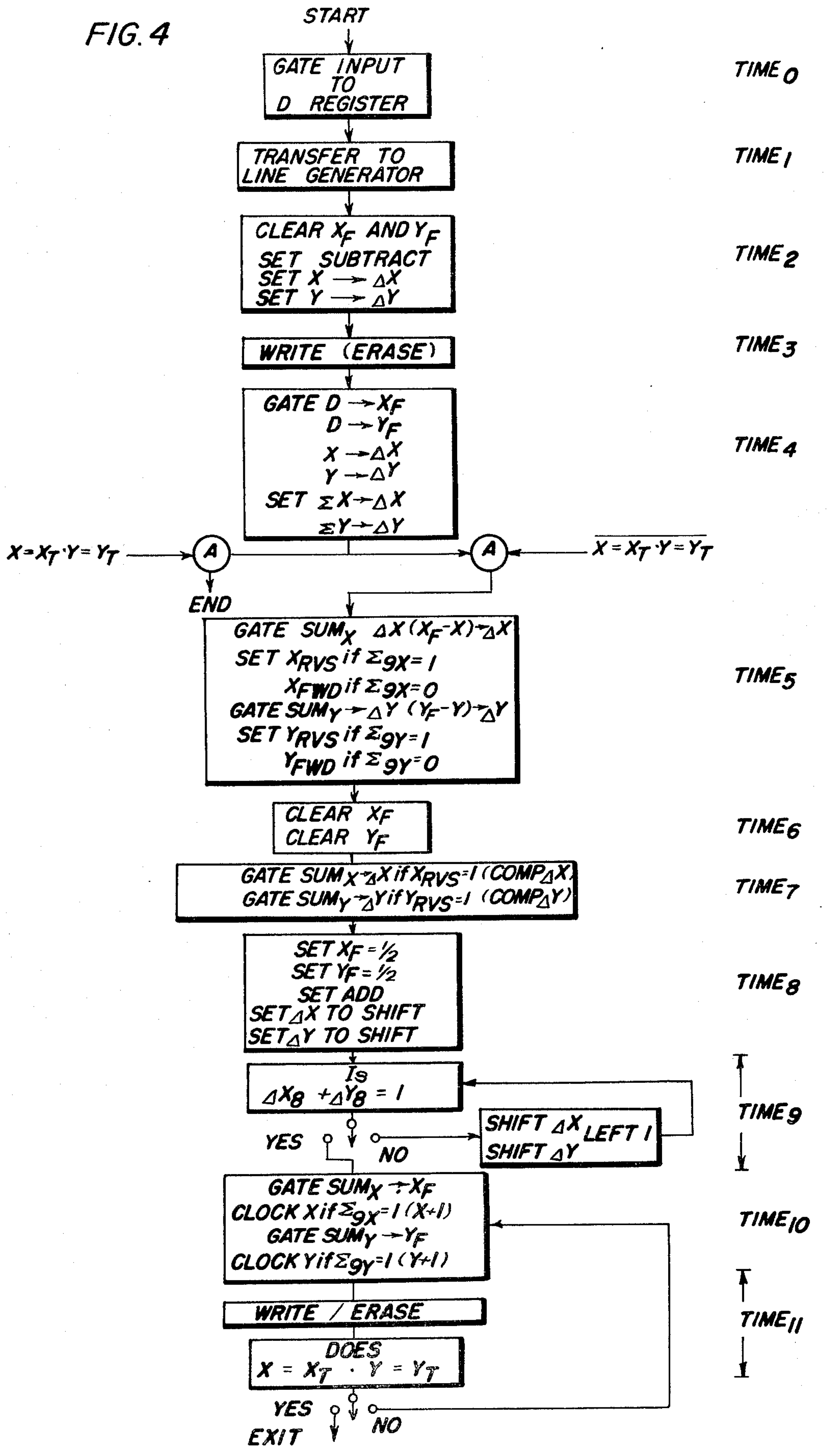
FIG. 4 is a flow diagram showing the sequence of operations followed by the line generator in plotting a line in accordance with the present invention.

The operation of the line generator may be better understood by reference not to the operational flow diagram of FIG. 4. More particularly, during Time 0 the terminal control center 53 loads the data word determining the end point coordinates ($x_f$, $y_f$) of the line to be plotted into the data register 49.

At Time 1 an error check is made on the data word to insure that a complete word has been received in the data register 49. Subsequently, the $X_F$ and $Y_F$ final coordinate registers 111 and 113 are cleared during Time 2, and the gating circuits 123 at the ADDER inputs are set to receive the complement of the ΔX and ΔY increment registers 107 and 109. At the same time, the gating logic at the input to the increment registers 107 and 109 is set to receive the contents of X and Y coordinate registers 63 and 65.

During Time 3, the point on the plasma display panel specified by the contents of the X and Y coordinate registers, 63 and 65, coupled to the X and Y decoder/-drivers, 67 and 69, and is written (i.e., lit) on the plasma display panel if the line generator is in the "write" mode or erased if it is in the "erase" mode.

Bits 10-18 of the data word, corresponding to the $x_f$ coordinate, are transferred to the $X_F$ final coordinate register 111 during Time 4 while bits 01-09, which correspond to the $y_f$ coordinate, are loaded into the $Y_F$ final coordinate register 113. Simultaneously, the contents of the X register 63 and the Y register 65 are transferred to the ΔX and ΔY increment registers 107 and 109, respectively. Further, the gating logic at the inputs to the ΔX and ΔY increment registers 107 and 109 are set to receive the corresponding outputs of the X and Y ADDERs, 119 and 121. At this time, if the contents of the data register 49 are equal to the contents of the X and Y registers 63 and 65, the line drawing process is terminated.

Next (Time 5), the complemented contents of the ΔX increment register 107 (i.e., $x_o$) are added to the binary $x_f$ coordinate contained in the $X_F$ final coordinate register 111 by the X ADDER 119. A binary "subtraction" correction factor, 000 000 001, is also added to the sum. The resultant output from the ADDER, $x_f$-$x_o$, is the distance between the origin and the end point of the line in the X direction. It is, in turn, loaded into the Δ$x$ increment register 107.

An identical operation is simultaneously performed in the Y section to determine the distance, $y_f$-$y_o$, between the origin and the end point in the Y direction. This quantity is then loaded into the ΔY increment register 109.

If, as a result of the "subtraction," an overflow occurs in one or both of the ADDERs the corresponding directional flip-flop is set to 0. If no overflow occurs, the directional flip-flops are set to 1.

The $X_F$ and $Y_F$ final coordinate registers 111 and 113 are cleared during Time 6, and immediately thereafter (Time 7) the contents of either or both increment registers are re-complemented if the corresponding directional flip-flops(s) are set to 0, indicating an overflow during the previous "subtraction" (Time 5). If the directional flip-flop is set to 1 during "subtraction," however, the contents of the corresponding increment register are not re-complemented.

During Time 8, the $X_F$ and $Y_F$ final coordinate registers 111 and 113 are both set equal to binary ½ (i.e., 100 000 000), and the gating circuits on the X and Y ADDERs 119 and 121 are set to receive the uncomplemented contents of the corresponding ΔX and ΔY increment registers 107 and 109. At this time, the increment registers are set to shift. Subsequently, during Time 9, the contents of both the ΔX and ΔY increment registers 107 and 109 are shifted left until one or both registers has a 1 in its most significant bit (i.e., $\Delta x_8$ or $\Delta y_8$). Following this step, the contents of the increment registers are:

$$\Delta X \text{ increment register } 107 = \frac{x_f - x_o}{2^{9-n}}$$

$$\Delta Y \text{ increment register } 109 = \frac{y_f - y_o}{2^{9-n}}$$

where $x_f$ and $y_f$ are the end point coordinates of the line to be plotted, $x_o$ and $y_o$ are the coordinates of the origin, and $n$ is the number of left shifts performed in this step.

The contents of the ΔX increment registers 107 are then added (Time 10) to the contents of the $X_F$ final coordinate register 111, and the sum is loaded back into the $X_F$ final coordinate register 111. An identical operation is simultaneously performed in the Y section. If the addition results in an overflow in one or both of the ADDERs (i.e., $\Sigma x_9$ or $\Sigma y_9 = 1$), the corresponding X or Y register is incremented if its directional flip-flop is set to 1 or decremented if it is set to 0.

Finally, at Time 11, the point on the plasma display panel specified by the incremented or decremented contents of the X and/or Y coordinate registers 63 and 65 is written if the line generator is in the "write" mode and erased of it is in the "erase" mode. The contents of the X and Y registers 63 and 65 are then compared with the contents of the data register 49, and if these quantities are not equal, the terminal control center 53 sends the line generator through the operations performed during Time 10. If, on the other hand, the contents are equal, the line drawing process is terminated.

Figure 5:
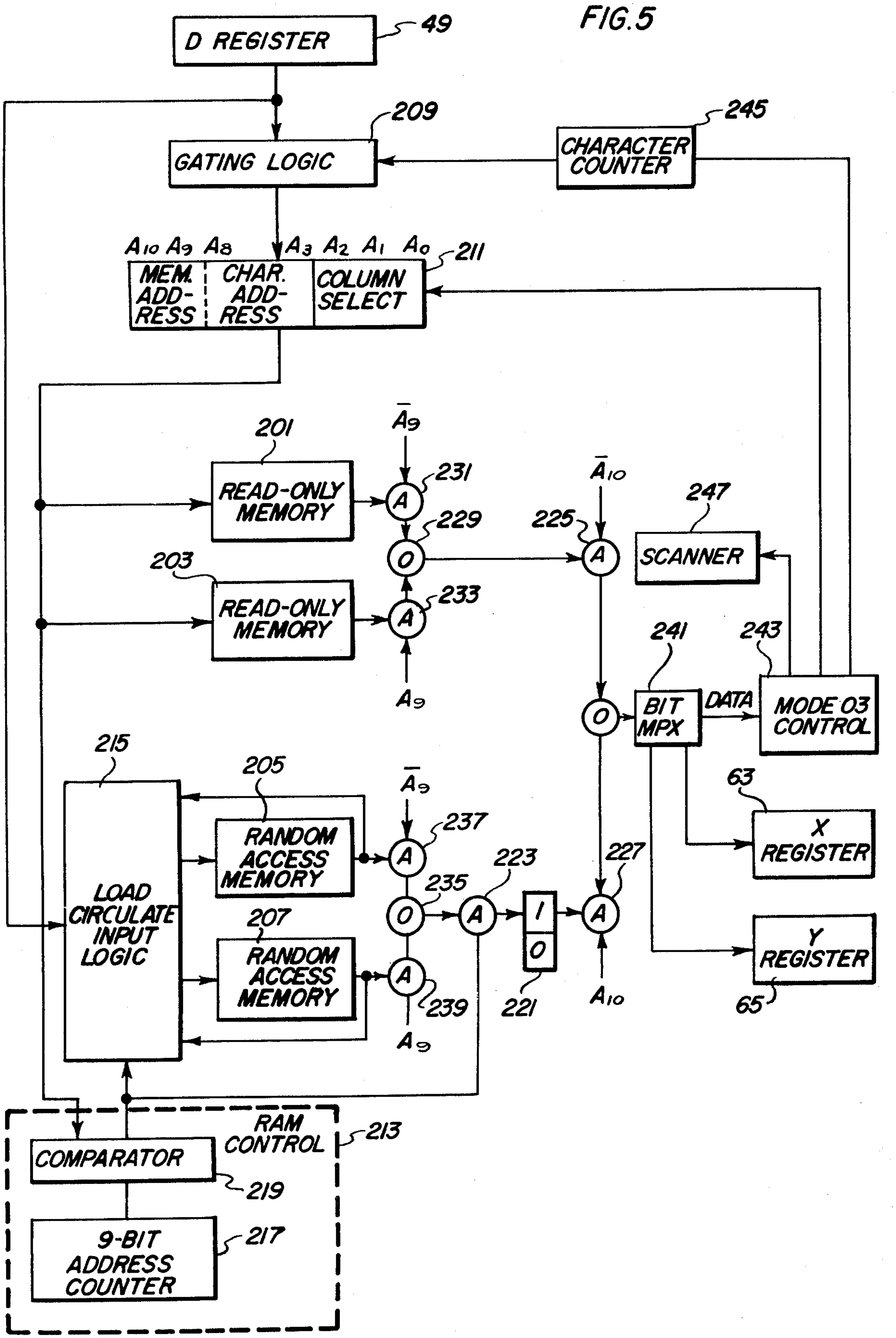
FIG. 5 is a combined schematic and block diagram of the novel character generator incorporated in the remote input/output terminal of the present invention.

Referring now to FIG. 5, there is shown a character generator in accordance with the present invention comprising a pair of read-only (ROM) memories, 201 and 203, and a pair of random-access (RAM) memories, 205 and 207.

As previously mentioned, certain characters and symbols are somewhat standard, e.g., lower and upper case English alphanumeric characters and mathematical and scientific symbols, while others are unique to other, perhaps less common, subject matter such as foreign languages. Accordingly, ROMs 201 and 203 are utilized to permanently store certain standard characters and symbols for repeated selective "read-out" on the plasma display panel. The RAMs, 205 and 207, on the other hand, although used to likewise store the other characters, can be dynamically altered by a computer instruction to change the contents contained therein. This re-loading capability makes the RAMs, 205 and 207, ideal for storing information which may subsequently be replaced by new information as required.

In order to display a particular character or symbol stored in one of the four memories, the appropriate addressable points on the plasma panel are lit responsive to the character generator. Each character is plotted on the plasma display panel within a corresponding subarea of the panel comprising an 8 × 16 matrix of addressable points, such as that shown in FIG. 6, by sequentially plotting eight 16-bit words to light the points necessary to reproduce the character.

Accordingly, each memory, i.e., ROMs 201 and 203 and RAMs 205 and 207, comprises sixteen 512-bit registers, each register storing one bit of every word contained in the memory. Thus, the sixteen bits at parallel addresses the registers form a single word corresponding to one vertical line in the 8 × 16 matrix comprising the character. Since eight such words are necessary to completely plot a character, each memory is capable of storing 64 different characters and/or symbols.

Operationally, a "Mode 3" Load Mode (LDM) control word (FIGS. 2*d*, 2*e*) is loaded into the data register 49 to enable the character generator. A "Mode 3" data word (FIG. 2*e*) is subsequently transferred into the data register 49. In particular, the "Mode 3" data word comprises three 6-bit character codes, identified generally as CHAR 1, CHAR 2 and CHAR 3, each corresponding to a particular "character address" in the memories.

The first two character codes, CHAR 1 and CHAR 2, immediately following the enabling "Mode 3" LDM control word, however, are used to load the "memory address," identifying the memory from which the character is to be read, into bits $A_9$ and $A_{10}$ of an 11-bit memory address register (MAR) 211 through a gating logic network 209. More particulrly, the CHAR 1 character code of the "Mode 3" data word is used to transmit what is arbitrarily designated to be the "uncover" code. This causes the next character code (CHAR 2) to be interpreted as an instruction selecting one of the four memories rather than as a "character address."

Having loaded the "memory address" into bits $A_9$ and $A_{10}$ of MAR 211, the character generator proceeds to suquentially load subsequent character codes selecting particular characters within that memory into the "character address" bits, $A_3$-$A_8$, of the memory address register 211. Once a "memory address" has been selected, any number of characters and symbols can be "read" from that particularly memory. A different memory can be selected at any time by utilizing an "uncover" code.

The "character address" loaded into bits $A_3$-$A_8$ of the memory address register 211 is then coupled directly to both of the read-only memories, 201 and 203. In response to the "address" signal, the characters and/or symbols at the corresponding address in both memories are provided at the outputs thereof.

Simultaneously, the address is coupled to the random-access memories 205 and 207 through the RAM control network 213 and the load-circulate input logic network 215. The registers comprising RAMs 205 and 207 are of the shift-type, that is, constantly shifting in synchronism at a predetermined rate to sequentially present, i.e., circulate, the 16-bit words comprising the stored data at the RAM outputs.

The RAM control network 213 comprises a 9-bit address counter 217 which is continuously counted from 0 to 511 to specify the address of the corresponding pair of words appearing at the outputs of RAMs 205 and 207. A comparator circuit 219 is also included to compare the contents of the address counter 217 with the "character address" contained in the memory address register 211. When the count in counter 217 is identical to the address in the memory address register 211, the comparator 219 generates an enable signal for storing, at that instant, the 16-bit word appearing at the RAM output corresponding to the "memory address" in a 16-bit flip-flop 221 coupled to the RAM outputs through AND gate 223. Thus, the addressed word, i.e., character, is maintained in the flip-flop 221 even though the shift registers continue to circulate the data past the RAM outputs.

As previously mentioned, coupling the "character address" contained in the memory address register 211 to each of the four memories results in the character or symbol at that address being developed at the corresponding memory address outputs. To insure that the proper one of the four characters so developed is actually plotted on the plasma display panel, memory output gating circuitry is interposed between the memory outputs and subsequent circuitry to selectively transfer the desired character from its particular memory to the plotting circuitry. Accordingly, the "memory address" code loaded into the $A_9$ and $A_{10}$ bit registers of MAR 211 selectively enables the output gating circuitry so that only the desired character or symbol is passed through the memory output gating circuitry.

More particularly, the output gating circuitry includes a pair of AND gates, 225 and 227, coupled to the outputs of memories 201 and 203 and memories 205 and 207, respectively. The AND gates, 225 and 227, in turn, coupled to the $A_{10}$ bit register in the memory address register 211 so that AND gate 225 is enabled if bit $A_{10}$ is set to 0 and AND gate 227 is enabled if it is set to 1. Thus, bit $A_{10}$ determines whether the read-only memories, 201 and 203, or the random-access memories, 205 and 207, are "read."

The other input to AND gate 225 is coupled through OR gate 229 to the outputs of a pair of AND gates 231 and 233. AND gate 231, in turn, has an input coupled to the corresponding output of ROM 201 while AND gate 233 has an input coupled to memory 203. The $A_9$ bit register output is inverted and coupled to the other input of AND 231 so that the character corresponding to the "character address" is passed through the output gating circuitry if bit $A_9$ is set to 0 (i.e., $\bar{A}_9$ is 1), and the "memory address" is 00. If, on the other hand, bit $A_9$ is set to 1, AND 233 is enabled, and the character or symbol is read from ROM 203, i.e., memory address 01.

In similar fashion, the other input to AND gate 227 is coupled through the word retention flip-flops 221, AND gate 223 and an OR gate 235 to the outputs of AND gates 237 and 239. AND 237 is coupled to the output or RAM 205, and AND 239 is coupled to RAM 207. The contents of the $A_9$ bit register in the memory address register 211 are inverted and applied to the other input of AND 237 while the $A_9$ bit register contents are coupled directly to AND 239. Consequently, when the "memory address" is 10, the output gating circuitry is opened so that the contents of RAM 205 will be stored in the word retention flip-flops 221 responsive to the RAM control 213 enabling AND 223. Conversely, the character is read from Ram 207 if the "memory address" is 11.

The first word (i.e., line) comprising the selected character or symbol is then coupled to the bit multiplexor 241 where the word is processed and coupled through the X and Y registers, 63 and 65 to the X and Y decoder/drivers, 67 and 69, (FIG. 1), for subsequent display in a corresponding 8 x 16 sub-area on the plasma display panel. The multiplexor 241 is effective to determine the relative position of the 8 × 16 character matrix on the plasma display panel with respect to the X-axis and the Y-axis so that a number of characters can be selectively positioned on the display panel.

Figure 6:
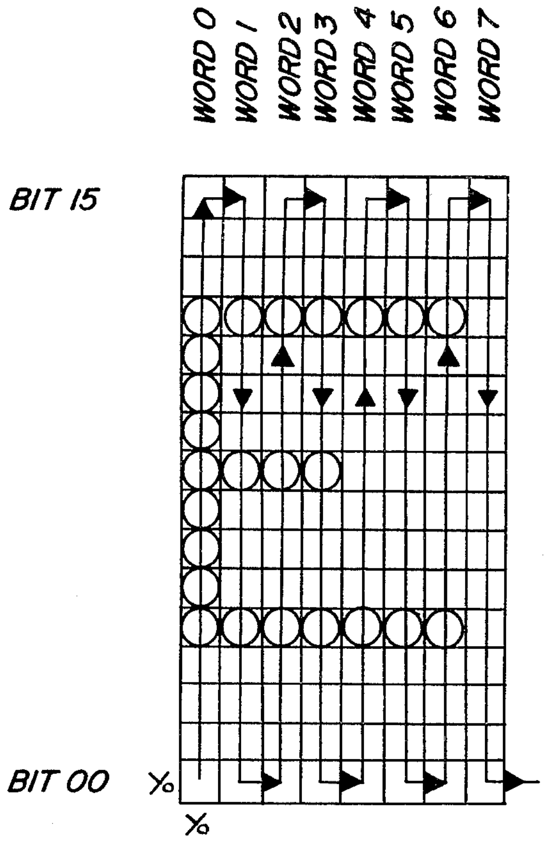
FIG. 6 illustrates the sequence in which the eight 16-bit words comprising the selected character are plotted on the plasma display panel.

The word is also coupled from the bit multiplexor 241 to the Mode 03 control 243 which processes each Mode 03 data word to generate timing signals required to operate the character generator. An output signal is coupled from the Mode 03 control 243 to increment the "column select" bits, $A_0$-$A_2$, of the memory address register 211. Initially, bits $A_0$-$A_2$ are set to 0, and consequently, the first 16-bit word comprising the character to be plotted is read from the appropriate memory and supplied to the bit multiplexor 241 for display on the plasma display panel. The Mode 03 control 243 then increments the "column select" bits of the memory address register 221 by one BCD count so that the next 16-bit word comprising the character is read from the memory and displayed. Thus, the "column select" bits, $A_0$-$A_2$, are incremented by the Mode 03 control 243 until eight successive 16-bit words have been read from the memory address and plotted on the panel as shown in FIG. 6.

After a complete character has been processed and displayed, the Mode 03 control 243 increments the character counter 245 so that the next 6-bit character code (e.g. CHAR 2) is loaded into the memory address register 211. The above-described sequence continues until all three 6-bit character codes comprising the Mode 03 data word have been processed by the remote terminal, and subsequently, a new Mode 03 data word can be loaded into the D register 49 for processing.

The Mode 03 control 243 is also coupled to the scanner 247 which combines with the bit multiplexor 241 to specify the contents of each bit of the character data words to the Mode 03 control 243.

Figure 7:
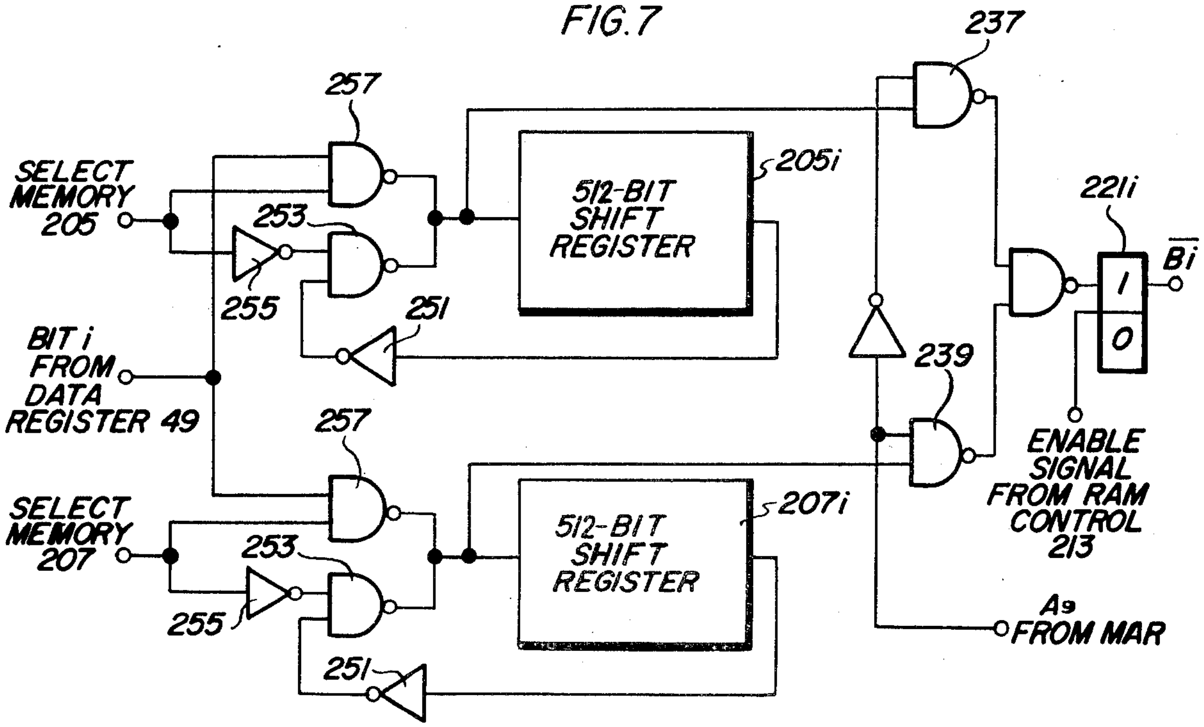
FIG. 7 is a schematic diagram of the randomaccess memories, the load-circulate logic and the output gating logic shown in FIG. 5.

The method and apparatus for loading new characters into the random-access memories 205 and 207 and the subsequent "reading" of the characters therefrom may be be better understood by reference now to FIG. 7.

There, a pair of 512-bit shift registers, **205*i* and 207*i*, are shown. Shift register 205*i* is representative of one of sixteen random-access shift registers, the other fifteen not being shown, comprising RAM 205. Together, the sixteen shift registers combine to simultaneously provide a single 16-bit word at their outputs. Conceptually, each of the sixteen shift registers may be analogized to a rotating wheel having the 512 bits of information spaced at equal intervals on its edge, the wheels being continuously moved past an output position in synchronism. Similarly, shift register 207*i* together with fifteen other identical shift registers (not shown) comprise RAM 207.**

More particularly, the 512 bits of data are continuously shifted to the right in synchronism through the shift registers (e.g., **205*i* and 207*i*). Consequently, during each such shift, a bit is output from the register. This bit is then coupled through a inverter 251 and applied to the input of an NAND gate 253. During the time when a character is being read from the memory, the other input to NAND 253 is set to 1 so that the output bit is reinverted by NAND 253** and loaded back into the input of the shift register.

Accordingly, to read a character or symbol from either of the two random-access memories, 205 or 207, the RAM control 213 generates an enable signal whenever the "character address" in MAR 211 corresponds to the address of the character appearing at the output of RAMs 205 and 207. The enable signal is applied to the retention flip-flop 221, and the particular AND gate, 237 or 239, responsive to the "memory address" is opened to transfer the bit from the memory output to the flip-flop 221*i*. Thus, even though the contents of the shift registers continue to circulate, the word corresponding to the character address is retained in sixteen flip-flops 221*i*. This data is then supplied to the bit multiplexer 241 for subsequent processing.

The characters contained in the shift registers 205*i* and 207*i* can be replaced with other characters as required by the terminal user during Mode 2 terminal operation. That is, a Mode 2 LDM control word (FIGS. 3*d* and 3*e*) is loaded into the data register 49, switching the remote terminal to its "load terminal memory" made of operation. To subsequently load a character or symbol into a particular address in the shift registers, a special instruction (i.e., the Load Memory Address (LDA) control word shown in FIG. 8) is loaded through the data register 49 and the gating logic network 209 into the memory address register 211. As is the case when a character is to be read from a memory, bits $A_9$ and $A_{10}$, i.e., the "memory address," designate the particular memory which is to be loaded while bits $A_3$-$A_8$ designate the particular "character address" within that memory where the character data is to be stored. Again, the column select bits, $A_0$-$A_2$, are set to 0 so that the eight 16-bit words comprising the character or symbol can be sequentially stored in the shift registers.

A Mode 3 data word containing the BCD data to be stored in the chosen memory at the designated "character address" is then loaded into the data register 49.

The "character address" loaded into the $A_3$-$A_8$ bit registers of the memory address register 211 is then coupled to the comparator 219 and the RAM address counter 217 is repetitively counted through its cycle from 0 to 511. Responsive to the "memory address," a control signal, i.e., SELECT MEMORY 205 or SELECT MEMORY 207, is generated by the RAM conrol 213 when the LDA character address and the count of the RAM address counter 217 are identical.

The SELECT MEMORY 205 or SELECT MEMORY 207 signal, whichever is generated responsive to the "memory address," is then applied through the corresponding inverter 255 to disable NAND gates 253, thereby preventing the reloading of the circulating output data back into the shift register. Simultaneously, the SELECT MEMORY (i.e., 205 or 207) enables the corresponding NAND gate 257. Consequently, bit *i* of the information in the data resister 49 is coupled to the other input of NAND 257 for loading into the appropriate shift register, 205*i* or 207*i*, as the case may be, to replace the information previously contained at that address.

Subsequent Mode 2 data words are then applied to the data register 49, and the column select bits ($A_0$-$A_2$) of the memory address register 211 are sequentially incremented so that the eight data words, each comprising 16-bits, are loaded into the shift registers, 205 or 207, at "memory address."

At all other times, when the shift registers 205 and 207 are not being loaded, NAND gates 257 are disabled while NAND gates 253 are enabled to circulate the contents of the shift registers comprising the random-access memories, 205 and 207.

Accordingly, there has been shown a remote input/output terminal incorporated both a line generator and a character generator in accordance with the present invention for presenting pictorial and graphical information on a display device such as a plasma display panel.

Thus, the remote input/output computer terminal is especially adaptable for use in teaching applications although it is equally useful in other remote terminal operations. That is, the line generator enables the remote terminal to graphically present pictorial information such as maps, graphs, circuit diagrams anatomical drawings or the like. Moreover, since the repertoire of the character generator can be dynamically altered by a computer instruction, the remote terminal can display foreign language characters and special symbols unique to a particular subject under study as well as standard characters such as upper and lower case English alphanumeric characters.

While in the present embodiment the line generator and the character generator have been described with reference to a plasma display panel, it should be recognized that other display devices, with slight adaptation, can be used. For example, the display device may comprise a cathode-ray tube having 500 line resolution. Depending upon the data format used, anywhere from 75,000 to 250,000 bits of memory may be required, however, to store images for presentation thereon. Moreover, a relatively high bandwith, typically 4.5 MHz, is required between the memory and the cathode-ray tube to prevent flicker of the image. Also, high-speed digital-to-analog (DA) convertors would be required to interface the digital remote terminal processing unit to the cathode-ray tube.

Direct viewing storage tubes may be used to overcome the flicker problem, but these devices suffer from low brightness and the inability to perform selective erase operations on the display data.

The plasma display panel, on the other hand, with its inherent memory, does not require refreshing. Because each point is stored on the plasma panel as it is displayed, the terminal electronics need operate only fast enough to stay ahead of the incoming data. A panel writing rate of 30 KHz is adequate for this application. The digital nature of the plasma display panel also eliminates the need for any digital-to-analog (DA) convertors.

While a particular embodiment of the present invention has been shown as described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. A method of plotting a line point by point at high speed on a plasma panel, the plasma panel having a plurality of addressable points in an electrode driven matrix array, each of the addressable points corresponding to particualar *x* and *y* coordinate electrodes, and means for selectively addressing and driving the electrodes to light certain ones of the addressable points, the point by point plotting on the plasma panel beginning at an origin at the initial coordinates, $x_o$ and $y_o$, and continuing to an end point at the final coordinates, $x_f$ and $y_f$, each of the coordinates being identifiable by a corresponding plurality of informational bits, the method comprising:

providing X and Y coordinate registers initially containing the informational bits corresponding to the initial coordinates, $x_o$ and $y_o$, of the addressable point on the plasma panel corresponding to the origin of the line to be plotted on the plasma panel;

providing $X_F$ and $Y_F$ final coordinate registers initially containing the informational bits corresponding to the final coordinates, $x_f$ and $y_f$, of the addressable point on the plasma panel corresponding to the end point of the line to be plotted on the plasma panel;

subtracting the bits comprising the initial plasma panel coordinates, $x_o$ and $y_o$, from the bits comprising the corresponding final plasma panel coordinates, $x_f$ and $y_f$, in corresponding X and Y ADDERs to obtain the differential quantities, $x_f - x_o$ and $y_f - y_o$, representative of the number of the addressable points in the $x$ and $y$ directions, respectively, between the initial coordinates, $x_o$ and $y_o$, and the final coordinates, $x_f$ and $y_f$, of the line to be plotted on the plasma panel, the subtracting including operating the X and Y ADDERs in a parallel data processing mode to process all of the informational bits simultaneously;

providing ΔX and ΔY increment registers for containing the informational bits corresponding to the differential quantities, $x_f - x_o$ and $y_f - y_o$, respectively;

loading all of the informational bits comprising the differential quantities, $x_f - x_o$ and $y_f - y_o$, simultaneously into the corresponding ΔX and ΔY increment registers;

clearing the $X_F$ and $Y_F$ final coordinate registers;

repetitively adding the differential quantity, $x_f - x_o$, contained in the ΔX increment register to the contents of the $X_F$ final coordinate register and the differential quantity, $y_f - y_o$, contained in the ΔY increment register to the contents of the $Y_F$ final coordinate register in the corresponding X and Y ADDERs, the adding including operating the X and Y ADDERs in a parallel data processing mode to process all of the informational bits simultaneously;

loading all of the informational bits comprising the resultant sums simultaneously into the corresponding final coordinate registers after each addition to replace the contents previously contained therein;

monitoring the X and Y ADDERs for overflows resulting during the repetitive adding;

incrementing the appropriate one of the X and Y coordinate registers once whenever the addition results in an overflow in the corresponding ADDER, addition continuing until the contents of the X and Y coordinate registers are equal to the corresponding final coordinates, $x_f$ and $y_f$, and coupling the contents of the X and Y coordinate registers to the addressing and driving means of the plasma panel, the addressing and driving means responsively addressing and driving the particular X and Y coordinate electrodes corresponding to the $x$ and $y$ coordinates contained in the X and Y coordinate registers to light the particular addressable point in the plasma panel corresponding to the coordinates defined by the corresponding X and Y coordinate electrodes.

2. The method of claim 1 in which the X and Y coordinate registers are set to decrement if the corresponding final coordinate is negative with respect to the corresponding initial coordinate, the X and Y coordinate registers otherwise being set to increment.

3. The method of claim 1 in which the differential quantities, $x_f - x_o$ and $y_f - y_o$, are simultaneously shifted in the ΔX and ΔY increment registers until a binary 1 appears in the most significant bit position of either increment register prior to the repetitive addition operation.

4. The method of claim 1, including, loading an automatic binary round-off factor into both the $X_F$ and $Y_F$ final coordinate registers after the $X_F$ and $Y_F$ final coordinate registers are cleared and prior to the repetitive addition operation to effect automatic round-off of the contents of the ΔX and ΔY increment registers during the repetitive addition operation.

5. The method of claim 1, including, adding the $x_f$ and $y_f$ final coordinates and a binary subtraction correction factor to the complements of the corresponding initial coordinates, $x_o$ and $y_o$, in the corresponding X and Y ADDERs to obtain the differential quantities, $x_f - x_o$ and $y_f - y_o$.

6. The method of claim 5 in which the resultant differential quantities, $x_f - x_o$ and $y_f - y_o$, are complemented if the corresponding final coordinate is negative with respect to the corresponding initial coordinate.

7. The method of claim 1 in which the contents of the X and Y coordinate registers are compared with the final coordinates, $x_f$ and $y_f$, respectively, after each addition, the repetitive addition being terminated when the contents of the X and Y coordinate registers are equal to the corresponding final coordinates, $x_f$ and $y_f$, respectively.

8. A method of plotting a line point by point at high speed on a plasma panel, the plasma panel having a plurality of addressable points in a matrix array, each of the addressable points corresponding to particular $x$ and $y$ coordinates, the point by point plotting on the plasma panel beginning at an origin at the initial coordinates, $x_o$ and $y_o$, each comprising a plurality of informational bits contained in $X$ and $Y$ coordinate registers, and continuing to an end point determined by the final coordinates, $x_f$ and $y_f$, each comprising a plurality of informational bits contained in $X_F$ and $Y_F$ final coordinate registers, respectively, the method comprising:

comparing the $x_o$ coordinate with the $x_f$ coordinate and the $y_o$ coordinate with the $y_f$ coordinate to terminate the line plotting operation if the corresponding coordinates are identical;

setting the ΔX and ΔY increment registers to the $x_o$ and $y_o$ coordinates contained in the X and Y coordinate registers, respectively;

loading all of the informational bits comprising the $x_f$ and $y_f$ final coordinates contained in the $X_F$ and $Y_F$ final coordinate registers simultaneously into X and Y ADDERs, respectively;

complementing and transferring all of the informational bits comprising the $x_o$ and $y_o$ coordinates simultaneously to the corresponding ADDERs;

adding a binary subtraction correction factor to the $x_f$ and complemented $x_o$ coordinates in the X ADDER and a binary subtraction correction factor to the $y_f$ and complemented $y_o$ coordinates in the Y ADDER to provide the differential quantities, $x_f - x_o$ and $y_f - y_o$, the adding including operating the X and Y ADDERs in a parallel data processing mode to process all of the informational bits simultaneously;

an overflow resulting in either of the corresponding X and Y ADDERs if the corresponding final coordinate is negative with respect to the initial coordinate;

setting the X and Y coordinate registers to decrement if an overflow occurs in the corresponding ADDER, the X and Y coordinate registers otherwise being set to increment;

loading the differential quantities, $x_f - x_o$ and $y_f - y_o$, into the ΔX and ΔY increment registers, respectively, by the simultaneous parallel transfer of all of the informational bits comprising the respective differential quantities;

clearing the $X_F$ and $Y_F$ final coordinate registers;

complementing the contents of the ΔX and ΔY increment registers, transferring the complemented quantity through the corresponding ADDER and loading the complemented quantity back into the corresponding one of the ΔX and ΔY increment registers whenever an overflow has resulted in the corresponding ADDER during the previous addition, said transferring and loading comprising the simultaneous parallel transfer of all of the informational bits;

loading a binary round-off factor into the $X_F$ and $Y_F$ final coordinate registers;

shifting the informational bits comprising the differential quantities, $x_f - x_o$ and $y_f - y_o$, in the corresponding ΔX and ΔY increment registers until a binary 1 appears in the most significant bit position of either of the ΔX and ΔY increment registers;

repetitively adding the contents of the ΔX increment register to the contents of the $X_F$ final coordinate register and the contents of the ΔY increment register to the contents of the $Y_F$ final coordinate register in the corresponding X and Y ADDERs, the adding including operating the X and Y ADDERs in a parallel data processing mode to process all of the informational bits simultaneously;

loading all of the informational bits comprising the resultant sums simultaneously into the corresponding one of the $X_F$ and $Y_F$ final coordinate registers after each addition to replace the contents previously contained therein;

counting the appropriate one of the X and Y coordinate registers once whenever the addition results in an overflow in the corresponding ADDER;

lighting the addressable point in the plasma panel corresponding to the coordinates contained in the X and Y coordinate registers as the X and Y coordinate registers are counted from the initial coordinates of the origin to the final coordinates of the end point; and comparing the contents of the X coordinate register with the $x_f$ final coordinate and the contents of the Y coordinate register with the $y_f$ final coordinate after each repetitive addition operation to terminate the repetitive addition when the corresponding quantities are equal.

9. A line generator for plotting a line point by point at high speed on a plasma panel, the plasma panel having a plurality of addressable points in an electrode driven matrix array, each of the addressable points corresponding to particular x and y coordinate electrodes, and means for selectively addressing and driving the electrodes to light certain ones of the addressable points, the point by point plotting on the plasma panel beginning at an origin at the initial coordinates, $x_o$ and $y_o$, and continuing to an end point at the final coordinates, $x_f$ and $y_f$, each of the coordinates being identifiable by a corresponding plurality of informational bits, the line generator comprising:

means including X and Y coordinate registers for initially containing the informational bits corresponding to the initial coordinates, $x_o$ and $y_o$, of the addressable point on the plasma panel corresponding to the origin of the line to be plotted on the plasma panel;

means including $X_F$ and $Y_F$ final coordinate registers for initially containing the informational bits corresponding to the final coordinates, $x_f$ and $y_f$, of the addressable point on the plasma panel corresponding to the end point of the line to be plotted on the plasma panel;

means including X and Y ADDERs for subtracting the bits comprising the initial plasma panel coordinates, $x_o$ and $y_o$, from the bits comprising the corresponding final plasma panel coordinates, $x_f$ and $y_f$, in corresponding X and Y ADDERs to obtain the differential quantities, $x_f - x_o$ and $y_f - y_o$, representative of the number of the addressable points in the $x$ and $y$ directions, respectively, between the initial coordinates, $x_o$ and $y_o$, and the final coordinates, $x_f$ and $y_f$, of the line to be plotted on the plasma panel, the means further including means for operating the X and Y ADDERs in a parallel data processing mode to process all of the informational bits simultaneously;

means including ΔX and ΔY increment registers for containing the informational bits corresponding to the differential quantities, $x_f - x_o$ and $y_f - y_o$, respectively;

means for loading all of the informational bits comprising the differential quantities, $x_f - x_o$ and $y_f - y_o$, simultaneously into the corresponding ΔX and ΔY increment registers;

means for clearing the $X_F$ and $Y_F$ final coordinate registers;

means for repetitively adding the differential quantity, $x_f - x_o$, contained in the ΔX increment register to the contents of the $X_F$ final coordinate register and the differential quantity, $y_f - y_o$, contained in the ΔY increment register to the contents of the $Y_F$ final coordinate register in the corresponding X and Y ADDERs, the means further including means for operating the X and Y ADDERs in a parallel data processing mode to process all of the informational bits simultaneously;

means for loading all of the informational bits comprising the resultant sums simultaneously into the corresponding final coordinate registers after each addition to replace the contents previously contained therein;

means for monitoring the X and Y ADDERs for overflows resulting during the repetitive adding;

means for incrementing the appropriate one of the X and Y coordinate registers once whenever the addition results in an overflow in the corresponding ADDER, addition continuing until the contents of the X and Y coordinate registers are equal to the corresponding final coordinates, $x_f$ and $y_f$; and means for coupling the contents of the X and Y coordinate registers to the addressing and driving means of the plasma panel, the addressing and driving means responsively addressing and driving the particular $x$ and $y$ coordinate electrodes corresponding to the $x$ and $y$ coordinates contained in the X and Y coordinate registers to light the particular addressable point in the plasma panel corresponding to the coordinates defined by the corresponding $x$ and $y$ coordinate electrodes.

10. In combination, a plasma panel for use in a computer controlled terminal and line generating means for plotting a line point by point at high speed on the plasma panel from an initial coordinate point comprising a plurality of informational bits to a final coordinate point comprising a plurality of informational bits, the plasma panel having a plurality of addressable coordinate points in a matrix array, the line generating means including:

driver means including a coordinate register for lighting the plasma panel at the addressable coordinate point corresponding to the contents of the coordinate register, the coordinate register initially containing the initial coordinate point of the line to be plotted;

adder means for subtracting the informational bits comprising the initial coordinate point from the informational bits comprising the final coordinate point to obtain the differential quantity, the adder means being operable in a parallel data processing mode to process all of the informational bits simultaneously, the adder means then repetitively adding the differential quantity to the sum of previous such additions; and means for incrementing the coordinate register once whenever the addition results in an overflow in the adder means, addition continuing until the coordinate register has been incremented to the final coordinate point, the driver means lighting the addressable coordinate points in the plasma panel responsive to the coordinate register being incremented to plot a line point by point from the initial coordinate point to the final coordinate point.

11. A character generator for selectively writing characters on a plasma panel, the plasma panel having a plurality of addressable points in an electrode driven matrix array, each of the addressable points corresponding to particular $x$ and $y$ coordinate electrodes, and means for selectively addressing and driving the electrodes to light certain ones of the addressable points, each of the characters being represented by a plurality, $m$, of n-bit data words which when plotted in a corresponding $m$-by-$n$ sub-array of the addressable points in the plasma panel depict a particular character, the character generator comprising:

addressable memory means for storing the n-bit data words comprising a plurality of the characters to be written on the plasma panel, the addressable memory means comprising at least first and second memory areas having corresponding outputs associated therewith for respectively outputting the n-bit data words stored therein, each of the characters being identified by a memory address corresponding to the particular one of the memory areas in which the character is stored and a character address corresponding to the relative location of the character in that particular one of the memory areas, each of the memory areas having a plurality of character addresses corresponding to the character addresses of the other memory areas;

means for synchronously coupling the n-bit data words comprising the characters stored in the several memory areas at the corresponding character addresses to the respective outputs of the corresponding memory areas;

addressing means for selecting a particular one of the characters to be written on the plasma panel, the addressing means designating the memory address of the memory area in which the selected character is stored and the character address corresponding to the location of the selected character in the memory area containing the plurality of n-bit data words comprising the character;

control means coupled to the addressable memory means for reading the n-bit data words at the designated character address in each of the memory areas from the respective outputs responsive to the character address of the characters in the several memory areas appearing at the respective outputs corresponding to the character address designated by the addressing means; and gating means coupled to the addressing means and to each of the memory area outputs, the gating means being responsive to the memory address designated by the addressing means for selectively coupling the plurality of n-bit data words comprising the selected character from the memory area containing the character to the plasma panel, the plurality of n-bit data words being coupled to the plasma panel addressing and driving means for sequential plotting in the corresponding sub-array of addressable points in the plasma panel to depict the selected character.

12. A character generator in accordance with claim 11 including load-circulate means for loading a new character into a selected one of the character addresses in a selected one of the memory areas to replace the character previously contained therein and wherein each memory area comprises $n$ shift registers having respective inputs coupled to corresponding outputs, the n-bit data words comprising the characters in the memory areas being continuously circulated in the shift registers to sequentially couple the n-bit data words to the outputs, the n-bit data words comprising the characters contained at corresponding character addresses in each of the memory areas sequentially appearing at the memory outputs simultaneously.

13. A character generator in accordance with claim 12 wherein the control means generates a SELECT signal when a particular one of the characters to be replaced is at the shift register outputs and wherein the load-circulate means further includes input gating means coupling the outputs of the shift registers to the corresponding shift register inputs for coupling the n-bit data words from the shift register outputs to the corresponding inputs, the input gating means being effective to block the shift register inputs from the corresponding outputs whenever the corresponding SELECT signal is generated, the n-bit data words comprising the new character being loaded into the input of the corresponding memory at that time.

14. A character generator in accordance with claim 11 wherein the control means comprises an address counter and comparator means, the address counter counting in synchronism with the n-bit data words being coupled to the memory area outputs, each of the counts being representative of the character address of the n-bit data words appearing simultaneously at the several memory area outputs, the comparator means comparing the count in the address counter with the character address designated by the addressing means and enabling the gating means for reading the n-bit data words from the memory area outputs whenever the count in the address counter is the same as the designated character address.

15. A character generator in accordance with claim 14 including retention flip-flops coupled to the gating means for storing the n-bit data words corresponding to the selected characters appearing at the memory area outputs and coupled through the gating means responsive to the control means enabling the gating means.

16. A character generator in accordance with claim 11 wherein the addressing means includes an address register comprising a plurality of bit registers, the memory address comprising a first binary word contained in the address bit registers and the character address comprising a second binary word contained in the other address bit registers.

17. A character generator in accordance with claim 16 wherein the gating means comprises a plurality of logic gates, each of the logic gates having a first input coupled to the output of a corresponding one of the shift registers and a second input coupled to the bit registers of the address register containing the memory address, the logic gates being selectively enabled responsive to the binary memory address to couple the selected character from the outputs of the shift registers comprising the corresponding memory area to the plasma panel.

18. In combination, a plasma panel for use in a computer controlled terminal and character generating means for writing characters on the plasma panel, the plasma panel having a plurality of addressable coordinate points in a matrix array, each of the characters being represented by a plurality, $m$, of n-bit data words which when plotted on a corresponding $m$-by-$n$ subarray of the addressable points in the plasma panel depict a particular character, the character generating means including:

a plurality of memories for storing the n-bit data words comprising a plurality of the characters, each of the characters being identified by a memory address corresponding to the particular one of the memories in which the corresponding n-bit data words are stored and a character address corresponding to the relative location of the selected character in the memory, each of the memories having an output from which the n-bit data words stored therein can be read;

means for synchronously coupling the characters in the several memories having the corresponding character address to the corresponding memory outputs;

addressing means for designating the memory address and the character address of a particular one of the characters to be written on the plasma panel;

means for reading the corresponding characters having the designated chracter address from each of the memories responsive to the characters being synchronously coupled to the corresponding memory outputs; and gating means coupled to the addressing means and to the outputs of the memories for selectively coupling the selected character from the memory corresponding to the designated memory address to the plasma panel, the plurality of n-bit data words being plotted in the plasma panel to depict the particular character selected.

19. In an input/output terminal having a plasma panel and for use with a central computer, the plasma panel having a plurality of addressable coordinate points in a matrix array, the improvement comprising:

line generating means for plotting a line point by point at high speed on the plasma device from an initial coordinate point to a final coordinate point, the line generating means including:

a. driver means including a coordinate register for lighting the plasma panel at the addressable coordinate points corresponding to the contents of the coordinate register, the coordinate register initially containing the initial coordinate point of the line to be plotted, b. adder means for subtracting the initial coordinate point from the final coordinate point to obtain the differential quantity, the adder means then repetitively adding the differential quantity to the sum of previous such additions, and c. means for incrementing the coordinate register once whenever the addition results in an overflow in the adder means, addition continuing until the coordinate register has been incremented to the final coordinate point, the driver means lighting the addressable coordinate points in the plasma panel responsive to the coordinate register being incremented to plot the line point by point from the initial coordinate point to the final coordinate point; and character generating means for writing characters on the plasma panel.

20. In an input/output terminal having a plasma panel and for use with a central computer, the plasma panel having a plurality of addressable coordinate points in a matrix array, the improvement comprising:

a character generating means for writing characters on the plasma panel, the character generating means including:

a. a plurality of memories for storing the characters, each of the characters being identified by a memory address corresponding to the one of the several memories in which the character is stored and a character address corresponding to the relative location of the selected character in the memory, each of the memories having an output from which the characters stored therein can be read;

b. means for synchronously coupling the characters in the several memories having the corresponding character address to the corresponding memory outputs;

c. addressing means for designating the memory address and the character address of a particular one of the characters to be written on the plasma panel, d. means for reading the corresponding characters having the designated character address from each of the memories responsive to the characters being synchronously coupled to the corresponding memory outputs, and e. gating means coupled to the addressing means and to the outputs of the memories for selectively coupling the selected character from the memory corresponding to the designated memory address to the plasma panel, the plurality of n-bit data words being plotted in the plasma panel to depict the particular character selected; and line generating means for plotting lines point by point at high speed on the plasma panel.

* * * * *

UNITED STATES PATENT OFFICE
CERTIFICATE OF CORRECTION

PATENT NO. : 3,911,417

DATED : October 7, 1975

INVENTOR(S) : John E. Stifle

It is certified that error appears in the above-identified patent and that said Letters Patent are hereby corrected as shown below:

Column 2, line 27, change "result" to --resultant--;
Column 2, line 55, change "incremented" to --increment--;
Column 4, line 35, insert hyphen between --randomaccess--;
Column 5, line 41, change the first "auadio" to --audio--; Column 7, line 38, change "it" to --lit--; Column 7, line 63, add "→" between --X Δ and Y Δ--; Column 8, line 6, add "→" between --Σ X and Σ Y; Column 8, lines 53 & 54, add "→" between --X̄ Δ and Ȳ Δ--; Column 9, line 30, add "→" between --X X and Y Y--; Column 10, line 23, insert "is" before --coupled--; Column 16, line 7, change "incorporated" to --incorporating--; Column 18, line 49, after "registers" put in -- respectively,--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*